United States Patent [19]

Bauer et al.

[11] Patent Number: 5,530,613

[45] Date of Patent: Jun. 25, 1996

[54] CURRENT LIMITING CIRCUIT CONTROLLER

[75] Inventors: James A. Bauer; Denis A. Mueller, both of Asheville, N.C.; Henry A. Wehrli, III; James D. B. Smith, both of Monroeville, Pa.

[73] Assignee: Eaton Corporation, Cleveland, Ohio

[21] Appl. No.: 251,880

[22] Filed: Jun. 1, 1994

[51] Int. Cl.[6] .................................................. H02H 3/093
[52] U.S. Cl. .................................................. 361/58; 361/27
[58] Field of Search .................................. 361/92, 58, 57, 361/27, 56, 23, 106; 219/546

[56] References Cited

U.S. PATENT DOCUMENTS

| | | | |
|---|---|---|---|
| 3,959,984 | 6/1976 | Vlasak | 361/104 |
| 4,151,575 | 4/1979 | Hogue | 361/92 |
| 4,413,301 | 11/1983 | Middleman et al. | 361/106 |
| 4,545,926 | 10/1985 | Fouts, Jr. et al. | 252/511 |
| 4,560,498 | 12/1985 | Horsma et al. | 252/511 |
| 4,775,778 | 10/1988 | van Konynenburg et al. | 219/549 |
| 4,780,598 | 10/1988 | Fahey et al. | 219/511 |
| 4,833,565 | 5/1989 | Bauer et al. | 361/154 |
| 4,893,102 | 1/1990 | Bauer | 335/132 |
| 5,064,997 | 11/1991 | Fang et al. | 219/505 |
| 5,296,996 | 3/1994 | Hansson et al. | 361/24 |

OTHER PUBLICATIONS

PTC Application Notes, Keystone Carbon Company Bulletin T–929, pp. 34–42.
PCT/SE91/00076, Aug. 22, 1991, Hansson et al.
PCT/SE91/00375, Dec. 12, 1991, Hansson et al.
PolySwitch® TR Series, Jan. 1993, 4 pages.
Klockner–Moeller Main Catalogue (HPL 90/91 GB, FLs/Br), pp. 9/1–9/28, published May 1990 in the Federal Republic of Germany.

Primary Examiner—Jeffrey A. Gaffin
Assistant Examiner—Sally C. Medley
Attorney, Agent, or Firm—Martin J. Moran

[57] ABSTRACT

A circuit controller for selectively connecting a power source to a load includes a non-overcurrent protective electrical switching mechanism and a conductive polymer current limiter connected in series with the load for limiting the current which flows through the switching mechanism whenever the power source is selectively connected to the load. The conductive polymer current limiter may include a plurality of parallel conductive polymer positive temperature coefficient (PTC) resistors. The circuit controller may include an electrical switching mechanism which, under short circuit conditions, remains selectively connected to the load. The short circuit current which is limited by the conductive polymer current limiter continues to flow through the electrical switching mechanism. The switching mechanism may include a contactor having separable contacts, and may further include a circuit interrupter, in order to provide a separate circuit disconnection mechanism. The electrical switching mechanism may have a coil and the circuit controller may include a voltage sensor. The conductive polymer current limiter may have an output which has a voltage substantially less than the voltage of the power source whenever the short circuit current flows from the power source and through the current limiter. The voltage sensor may be connected to the output of the conductive polymer current limiter and may deenergize the coil in order to open the separable contacts of the contactor and disconnect the power source from the load whenever the voltage of the output drops below a predetermined threshold. The contactor may be a motor-starting contactor.

2 Claims, 5 Drawing Sheets

5,530,613

CURRENT LIMITING CIRCUIT CONTROLLER

CROSS REFERENCE TO RELATED APPLICATIONS

The inventions taught herein are related to a concurrently filed commonly assigned application Ser. No. 08/251,873 entitled "LOW COST CIRCUIT CONTROLLER" by James A. Bauer et al. (Attorney Docket No. 94-ECC-051). The inventions taught herein are further related to commonly assigned application Ser. No. 08/161,017 entitled "COMBINATION LOAD CONTROLLER" (Attorney Docket No. 57,523) filed Dec. 3, 1993 and application Ser. No. 08/139,679 entitled "SANDWICH CONSTRUCTION FOR CURRENT LIMITING POSITIVE TEMPERATURE COEFFICIENT PROTECTIVE DEVICE" (Attorney Docket No. 57,767) filed Oct. 22, 1993.

BACKGROUND OF THE INVENTION

1. Field of the Invention

This invention relates to an electrical circuit controller for protecting a power circuit and a load powered by the power circuit, and more particularly to a contactor having an external current limiting conductive polymer resistance for providing current limiting protection in the power circuit.

2. Background of Information

Electromagnetic contactors are electrically operated switches used for controlling motors and other types of electrical loads. Contactors include a set of movable electrical contacts which are brought into contact with a set of fixed electrical contacts to close the contactor and connect a power line to the load. The set of movable contacts are separated from the set of fixed contacts to open the contactor.

Contactors also include a magnetic circuit having a fixed magnet and a movable armature with an air gap therebetween when the contactor is opened. An electromagnetic coil is controllable upon command to interact with a source of voltage for electromagnetically accelerating the armature towards the fixed magnet, thus reducing the air gap. Disposed on the armature is the set of movable contacts. The complementary set of fixed contacts are fixedly disposed within the contactor case and engage the movable contacts as the magnetic circuit is energized and the armature is moved. The load and voltage source therefor are interconnected with the fixed contacts and become interconnected with each other as the movable contacts make with the fixed contacts.

Contact erosion in contactors primarily occurs during a contact breaking cycle. During such cycle, the separable contacts (i.e., the fixed contacts and the movable contacts) part and the current flowing therethrough forms an arc. Continued arcing eventually interferes with the ability of the separable contacts to conduct electricity. The surface of the separable contacts may become eroded, pitted or may have carbon build-up.

A motor-starting contactor with a thermal overload protection relay system is called a motor starter. The purpose of an overload relay is to sense heat produced by line current and "trip" or stop the motor if the retained heat exceeds an acceptable level. State of the art overload protection relay systems include current sensors which output a voltage proportional to the current. After an analog-to-digital conversion of the voltage, a microprocessor squares and integrates the converted digital value to achieve a true measure of motor heating. This approach provides an accurate degree of motor protection. However, the overload relay cannot effectively interrupt the entire short circuit current. Without additional circuit protection, the short circuit current may damage the separable contacts of the contactor.

Circuit breakers are generally used to protect electrical circuitry from damage due to an overcurrent condition, such as an overload fault or a relatively high level short circuit condition. An overload fault condition is normally about 125–600 percent of the nominal current rating of the circuit breaker. A high level short circuit condition can be 1000 percent or more of the nominal current rating of the circuit breaker. For example, in a bolted three phase line-ground fault, the short circuit current may exceed 100 KA at 480 VAC.

In conventional motor starter installations, a three-phase power source powers a motor through a circuit breaker and a separate motor starter having an overload protection relay. The circuit breaker generally provides both overcurrent protection and power circuit disconnection functions. Under short circuit fault conditions, the circuit breaker acts first to protect the power circuit. This is because the motor starter trip characteristics are generally designed for interrupting, after an $I^2t$ time delay period, persistent overload currents associated with motor overloads. In the event of a motor starter failure, involving welded contacts, the circuit breaker may also be used to disconnect the power source from the motor.

Positive temperature coefficient (PTC) resistive elements are known to be used as reusable fuses. A PTC resistive element exhibits a relatively low resistance to a flow of electrical current when the current is below a threshold value. Current above the threshold value flowing through the PTC resistive element causes resistive heating of the PTC element. A rise in internal temperature of the PTC resistive element to above a transition temperature causes the PTC element to transition into a state of high resistance, thereby limiting current flow through the PTC element and the circuit containing it.

As stated in *PTC Application Notes,* Keystone Carbon Company Bulletin T-929, page 37, "[t]he dramatic rise in resistance of a PTC at the transition temperature makes it an ideal candidate for current limiting applications. For currents below the limiting current ($I_L$), the power being generated in the unit is insufficient to heat the PTC to its transition temperature. However, when abnormally high-fault currents flow, the resistance of the PTC increases at such a rapid rate that any further increase in power dissipation results in a reduction in current."

Examples of PTC resistive devices include silicon carbide, tungsten, polycrystalline ceramic barium titanate, barium and strontium titanate, and current limiting conductive polymers.

Current limiting conductive polymers are known in the art to be useful for limiting electrical current. For example, Raychem Corporation manufactures and markets a current limiting polymer under the trademark PolySwitch™. Current limiting polymers having PTC characteristics are disclosed in U.S. Pat. Nos. 4,545,926; 4,560,498 and 4,775,778, all owned by Raychem Corporation. Current limiting polymers typically comprise cross-linked polyethylene, heavily doped with carbon. PTC's typically have a low electrical resistance when conducting current below a threshold value (i.e., when the PTC is relatively cool). When current flowing through the PTC exceeds the threshold value, resistive heating produces a rise in the internal temperature of the PTC, causing a reduction in conductivity (i.e., an increase in electrical resistance). The power dissipated in the PTC is proportional to the resistance multiplied by the square of the current. Therefore, for a constant or increasing current flow, an increase in resistance leads to a further increase of resistance. This increase in resistance is, thus, quite rapid. Typically, the increase in resistance is virtually a step function once the magnitude of the current (and the resulting internal temperature of the polymer) surpasses the threshold value.

The change in resistance of the PTC upon passing the threshold value is quite large. For example, the resistance of a current limiting polymer upon passing the threshold value may rapidly increase by a factor of 1,000 to greater than 4,000 times its initial resistance. Whenever the PTC is connected in a power system in series with a load, the increase in resistance of the PTC increases the total load resistance and, thus, substantially reduces the load current. However, the increase in resistance of the PTC produces a corresponding increase in the voltage drop across the PTC and a corresponding decrease in the voltage drop across the load. In this manner, a larger portion of the power from the power line is dissipated in the PTC as heat, as opposed to being dissipated by the load. Depending on the application (i.e., the line voltage and the load resistance), the voltage drop across a PTC which has transitioned to a high resistance state may be substantial and may result in destruction of the PTC. This is especially true when a conductive polymer is used as the PTC. Furthermore, PTC's are known to exhibit negative temperature coefficient (NTC) resistance characteristics if the internal temperature of the PTC goes much beyond the PTC threshold value. If heated to the NTC threshold value, the resistance of the PTC decreases.

Placing a PTC in thermal communication with a heat producing component is known in the art. Such an arrangement is disclosed in U.S. Pat. Nos. 4,780,598 and 5,064,997, both owned by Raythem Corporation. As disclosed in U.S. Pat. Nos. 4,780,598 and 5,064,997, the heat producing component is a voltage-dependent resistor. The voltage-dependent resistor and the PTC are electrically coupled in a series circuit with components to be protected from excessive current flow. The heat producing component radiates heat to the PTC to accelerate its transition into a state of high resistance to protect the other circuit components.

In contrast to the use of circuit breakers which interrupt short circuit fault currents, various proposals have been advanced for limiting such fault currents in conventional motor starter installations. International Application Number PCT/SE91/00076 discloses a circuit breaker comprising a trip circuit, a trip coil, a set of contacts responsive to the trip coil, and a positive temperature coefficient conductive polymer thermistor in series with the set of contacts. The thermistor limits the magnitude of the short-circuit current. However, the coil of the trip circuit rapidly opens the contacts within approximately 5 ms after a fault current exceeds five to ten times rated current.

It is well known that conductive polymers have a relatively limited heat capacity characteristic. Thus, prior art proposals utilize a separate overcurrent protective circuit, such as a circuit breaker trip coil or a motor starter overload relay, to open the power circuit within two power line cycles. In this manner, the conductive polymer current limiter is protected from excessive temperatures during short circuit fault conditions. Therefore, the prior art proposals which use conductive polymers either require a circuit breaker for rapidly interrupting the short circuit fault current or, else, require a contactor having an overload relay or a special sensor for interrupting the current flow after a limited number of power line cycles. In either case, the circuit breaker, the overload relay or the sensor must act relatively quickly (i.e., within a few power line cycles) after a short circuit fault in order to protect the conductive polymer current limiter.

Prior art applications, of necessity, rapidly interrupted the short circuit fault current before the temperature of the conductive polymer rose to a destructive level. In the same manner, such prior applications rapidly interrupted the short circuit fault current before the resistance of the conductive polymer rose to a sufficient resistance which divided substantially all of the power line voltage across the conductive polymer. Furthermore, such prior applications, of necessity, rapidly interrupted the short circuit fault current flowing through the power circuit before the current and load side voltage were substantially reduced. Accordingly, contact arcing and contact erosion of the separable contacts of the contactor persist.

There is a need, therefore, for a contactor which minimizes contact arcing and contact erosion under short circuit conditions.

There is a more particular need for such a contactor which protects a power circuit from damage under short circuit conditions.

There is an even more particular need for such a contactor which is not damaged or seriously degraded under short circuit conditions.

There is another even more particular need for a circuit controller which protects a power circuit from damage without requiring a circuit breaker.

SUMMARY OF THE INVENTION

These and other needs are satisfied by the invention which is directed to a circuit controller for selectively connecting a power source to a load. The circuit controller includes a non-overcurrent protective electrical switching mechanism for selectively connecting the power source to the load and a conductive polymer current limiter connected in series with the load. The non-overcurrent protective electrical switching mechanism switches a current which flows from the power source and through the non-overcurrent protective electrical switching mechanism. The conductive polymer current limiter limits the current which flows through the non-overcurrent protective electrical switching mechanism whenever the power source is selectively connected to the load and substantially limits all of the short circuit current which flows through the non-overcurrent protective electrical switching mechanism from the power source.

The conductive polymer current limiter, which is connected in series with the non-overcurrent protective electrical switching mechanism between the power source and the load, may exhibit a first lower electrical resistance when conducting a first rated current. This first lower electrical resistance may rapidly increase to a second substantially higher electrical resistance when conducting a second short circuit current which is higher than the first rated current. A ratio of the second substantially higher electrical resistance to the first lower electrical resistance may exceed 4,000. The conductive polymer current limiter may include a plurality of parallel conductive polymer positive temperature coefficient (PTC) resistors.

Under short circuit conditions, the electrical switching mechanism remains selectively connected to the load. The short circuit current which is limited by the conductive polymer current limiter continues to flow through the electrical switching mechanism. The electrical switching mechanism may include a contactor having separable contacts. Alternatively, the electrical switching mechanism may further include a circuit interrupter which is connected in series with the separable contacts of the contactor, in order to provide a separate circuit disconnection mechanism. The contactor may be a motor-starting contactor.

Alternatively, the circuit controller may include an electrical switching mechanism having separable contacts and a coil, a conductive polymer current limiter connected in series between the power source and the electrical switching mechanism, and a voltage sensor. The conductive polymer current limiter substantially limits all of the short circuit current which flows from the power source. An output of the conductive polymer current limiter has a voltage substantially less than the voltage of the power source whenever the short circuit current flows from the power source and through the current limiter. The voltage sensor is connected to the output of the conductive polymer current limiter. Whenever the output voltage of the conductive polymer current limiter drops below a predetermined threshold, the voltage sensor deenergizes the coil of the electrical switching mechanism, in order to open the separable contacts of the electrical switching mechanism and disconnect the power source from the load.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
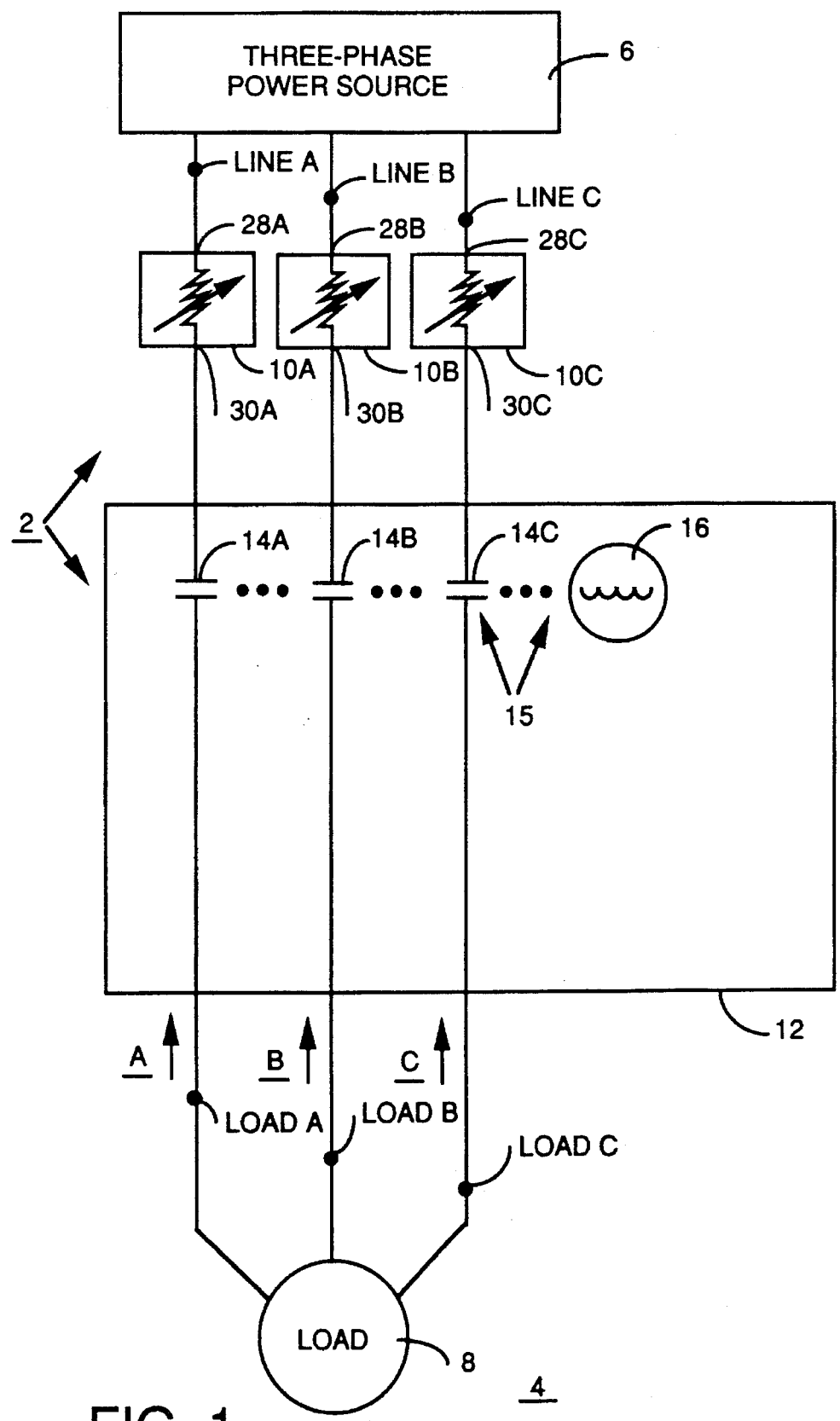
FIG. 1 is a block diagram of a circuit controller in accordance with the invention.

Referring to FIG. 1, a block diagram of a circuit controller 2 is illustrated. The exemplary controller 2 is configured in an exemplary power circuit 4 having a three-phase alternating current (AC) power source 6 and a three-phase AC load 8, it being understood that the invention is applicable to controllers, power sources and loads having any number of phases, and furthermore, it being understood that the invention is applicable to direct current (DC) controllers, power sources and loads. The controller 2 selectively connects three power line phases LINE A, LINE B, LINE C of the power source 6 to three power inputs LOAD A, LOAD B, LOAD C, respectively, of the load 8. The controller 2 includes three current limiters 10A, 10B, 10C and an exemplary contactor 12 having three separable contacts 14A, 14B, 14C for switching the flow of current from the power source 6 through the contactor 12. The contactor 12 also includes an electromagnet 15 and a contactor coil 16. Whenever the coil 16 is energized, the separable contacts 14A, 14B, 14C are first closed and then are held closed in order to connect the three-phase power source 6 to the three-phase load 8. On the other hand, whenever the coil 16 is deenergized, the separable contacts 14A, 14B, 14C are opened, thereby disconnecting the power source 6 from the load 8.

Electromagnetic contactors are well known in the art; an example is disclosed in U.S. Pat. No. 5,315,471, issued May 24, 1994 to Rick A. Hurley et at. entitled "Coil Current Regulator with Induced Flux Compensation in an Electromagnetic Contactor System", which is herein incorporated by reference, it being understood that the present invention is applicable to a wide variety of electromagnetic switching devices, such as vacuum, air gap and insulating gas contactors or motor starters. A complete description of a motor-starting contactor having an overload relay is disclosed in U.S. Pat. No. 4,893,102, issued Jan. 9, 1990, which is herein incorporated by reference.

The current limiters 10A, 10B, 10C are connected in series with the power inputs LOAD A, LOAD B, LOAD C, respectively, of the load 8 and limit the three-phase currents which flow through the controller 2 whenever the power source 6 is selectively connected to the load 8. Three power circuits A, B, C for the three phases are formed by the series connection of the power lines LINE A, LINE B, LINE C, the current limiters 10A, 10B, 10C, the separable contacts 14A, 14B, 14C, and the power inputs LOAD A, LOAD B, LOAD C, respectively.

Figure 2:
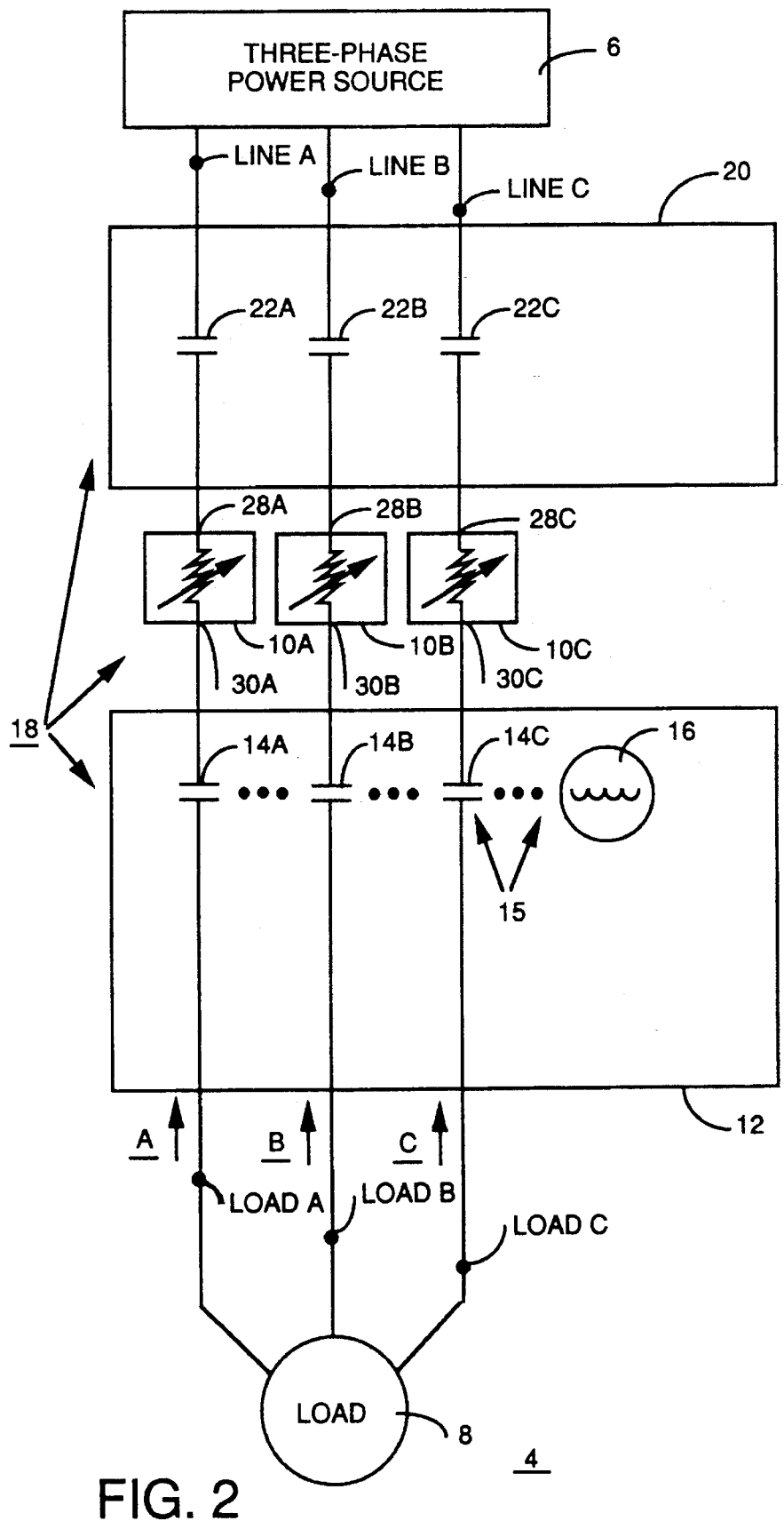
FIG. 2 is a block diagram of a circuit controller in accordance with an alternative embodiment of the invention.

Referring now to FIG. 2, a block diagram of an alternative embodiment of the circuit controller is illustrated. In this alternative embodiment, a circuit controller 18 includes an electromagnetic switching device, such as the exemplary contactor 12, the current limiters 10A, 10B, 10C, and a separate disconnection mechanism, such as the exemplary circuit interrupter 20. The circuit interrupter 20 includes three separable contacts 22A, 22B, 22C which are connected in series between the three power lines LINE A, LINE B, LINE C and the current limiters 10A, 10B, 10C, respectively. The principal function of the circuit interrupter 20 and the separable contacts 22A, 22B, 22C is to provide a mechanism independent of the separable contacts 14A, 14B, 14C for disconnecting the three-phase power source 6 from the load 8.

Figure 3:
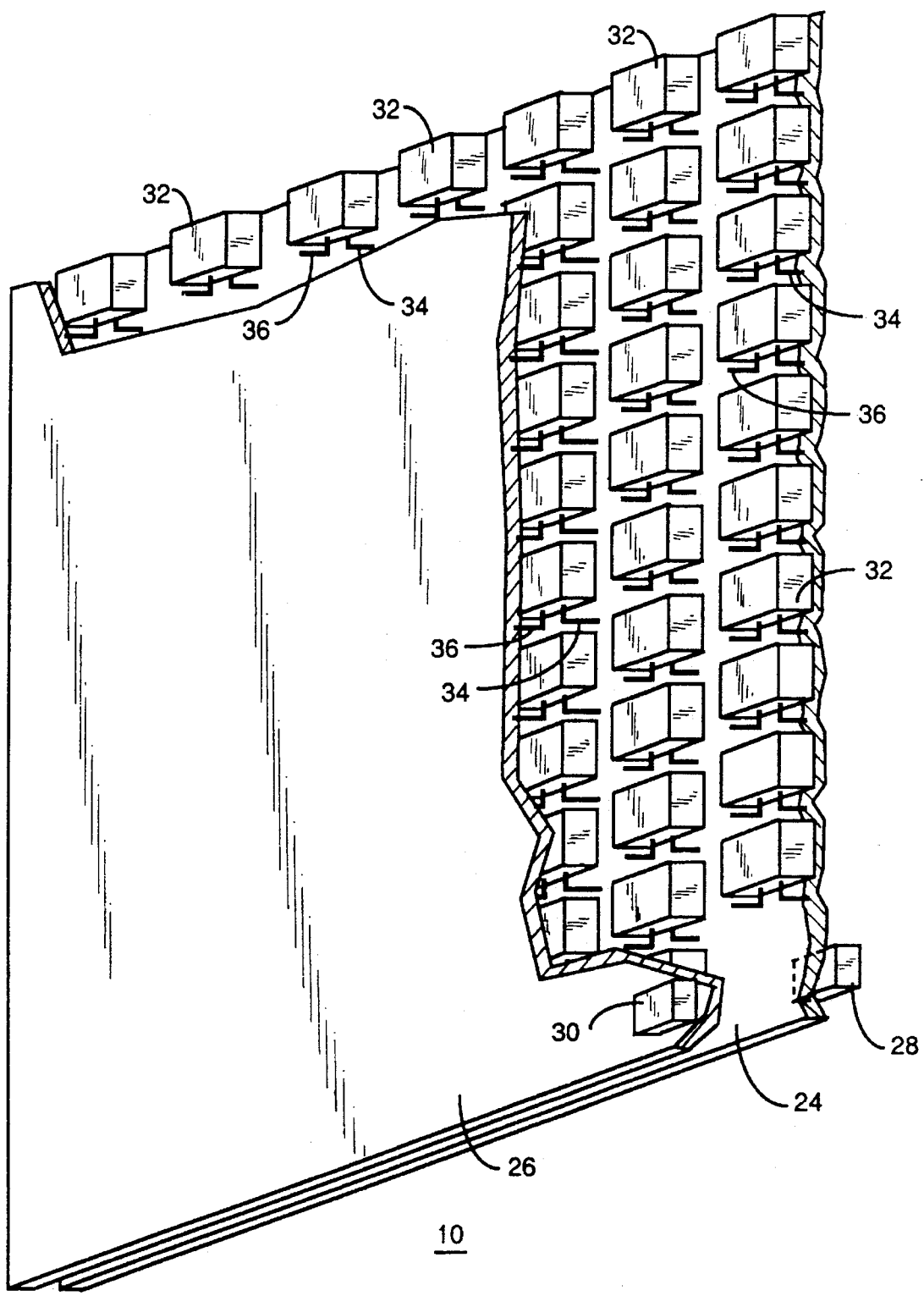
FIG. 3 is an isometric view of a conductive polymer current limiter having a plurality of positive temperature coefficient (PTC) conductive polymer resistors in accordance with the invention.

FIG. 3 illustrates an isometric view of the exemplary conductive polymer current limiter 10 for one of the power circuits A, B, C of FIGS. 1 and 2. The current limiter 10 includes two rectangular conductive plates 24, 26 which are electrically connected to two terminals 28, 30, respectively. The terminals 28, 30 are attached to the respective plates 24, 26 on opposite sides of the current limiter 10. The terminals 28, 30 are electrically connected in series between the power source 6 and the contactor 12. The exemplary current limiter 10 further includes a plurality of positive temperature coefficient (PTC) conductive polymer resistors 32. The exemplary resistor 32 is manufactured and marketed by Raychem Corporation under order number PolySwitch™ TR600-150, it being understood that the invention is applicable to a variety of PTC resistive devices such as silicon carbide, tungsten, polycrystalline ceramic barium titanate, or barium and strontium titanate.

Each of the plural resistors 32 has two leads 34, 36 which are connected to the plates 24, 26, respectively, and, hence, each of the plural resistors 32 is connected in parallel with each of the other plural resistors 32. The exemplary current limiter 10 includes 76 of the exemplary resistors 32 which are generally configured in a seven by eleven array between the plates 24,26. The 77th position of the exemplary array being used for the position of the terminals 28,30. Accordingly, the parallel combination of the resistors 32 is connected in series with the contactor 12 between the power source 6 and the load 8. Table I, below, provides various dimensions for the exemplary current limiter 10.

TABLE I

| DIMENSION OF ITEM | (inches) |
| --- | --- |
| HEIGHT OF PLATES 24,26 | 4.0 |
| WIDTH OF PLATES 24,26 | 4.0 |
| THICKNESS OF PLATES 24,26 | 0.125 |
| HEIGHT OF RESISTOR 32 | 0.354 |
| WIDTH OF RESISTOR 32 | 0.531 |
| THICKNESS OF RESISTOR 32 | 0.236 |
| THICKNESS OF CURRENT LIMITER 10 | 0.5 |

As described in greater detail below, the exemplary current limiter 10 has a positive temperature coefficient (PTC) resistance which increases with corresponding increases in temperature of the current limiter 10. Furthermore, changes in the temperature of the current limiter 10 are determined by resistive ($I^2R$) heating of the current limiter 10. In other words, the current limiter 10 exhibits a relatively low resistance to a flow of electrical current when the current is below a threshold value (e.g., when the current is less than or equal to the rated current of the contactor 12). However, current above the threshold value (e.g., a short circuit fault current) flowing through the current limiter 10 causes further resistive heating and a corresponding rise in internal temperature of the current limiter 10. In turn, this causes the current limiter 10 to rapidly transition to a state of substantially higher resistance. In this manner, the conductive polymer current limiter 10 substantially limits all of the short circuit current which flows from the power source 6 and through the contactor 12.

During normal operation, the resistances of the plural resistors 32 remain relatively low. The parallel connection of the plural resistors 32 reduces the resistance of the exemplary current limiter 10 by a factor of 76 below the resistance of each resistor 32. Furthermore, since the resistance is low, the power line voltage drop across the resistors 32 also is relatively low. As with most conductors, an increase in current passing through the resistors 32 causes a related rise in the internal temperature of the resistors 32. Whenever the internal temperature of one of the resistors 32 is increased above a threshold temperature, the resistance of such resistor 32 increases substantially. The exemplary power source 6 may source, for example, a per phase short circuit current of 4.5 KA at 220 VAC (rms). Under ambient temperature conditions, the exemplary conductive polymer current limiter 10 limits such short circuit current to 600 A peak and 15 A peak under steady state short circuit conditions. Table II, below, provides resistance values for the exemplary current limiter 10 under various conditions.

TABLE II

| CONDITION | (Ω) |
| --- | --- |
| INITIAL OR NOMINAL | 0.118 |
| PEAK RESISTANCE | 475 |
| STEADY STATE SHORT CIRCUIT | 20 |

Figure 4:
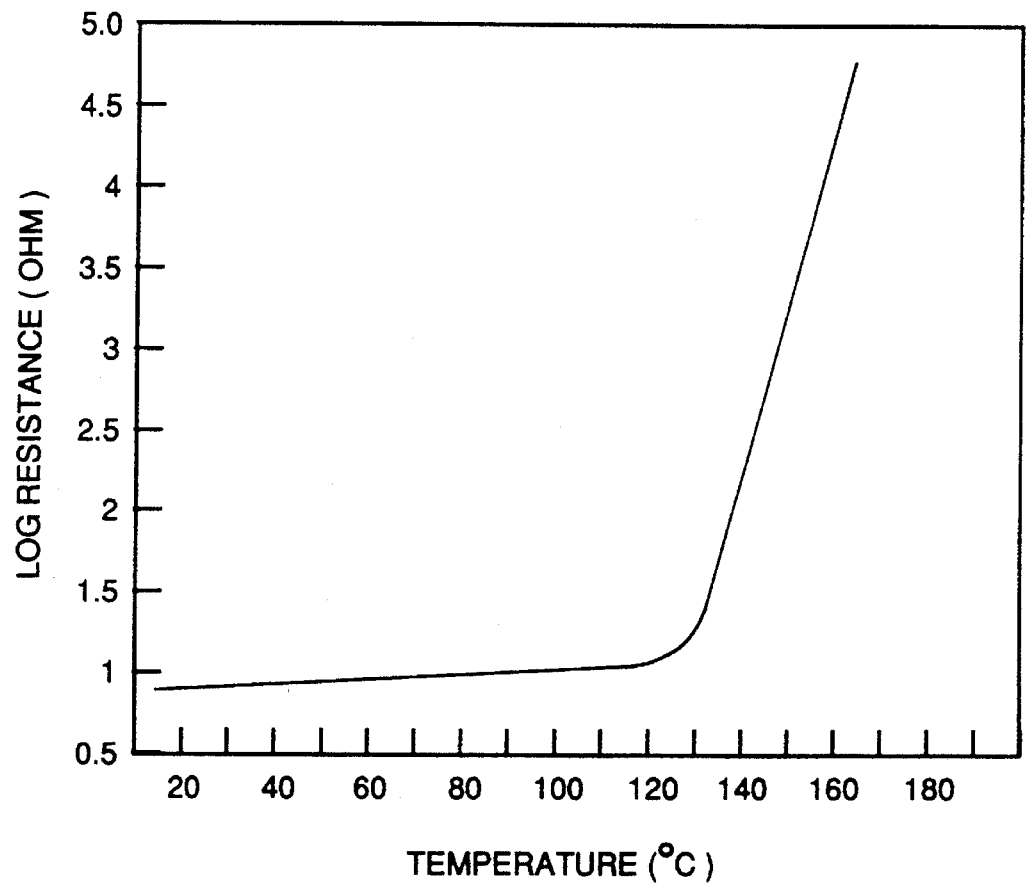
FIG. 4 is a graph of PTC conductive polymer resistance with respect to temperature in accordance with the invention.

Referring now to FIGS. 3 and 4, FIG. 4 illustrates a graph of resistor temperature (°C.) versus $\log_{10}$ resistance (Ω) for resistor 32. As illustrated by FIG. 4, the initial or nominal resistance of approximately 9 Ω (i.e., 0.95 in the graph) corresponds to a wide temperature range (i.e., from less than 20° C. through approximately 125° C.). The nominal resistance also corresponds to currents flowing through the contactor 12 which are less than or equal to the rated current of the contactor 12. Whenever a short circuit fault current flows through the current limiter 10, the temperature of each of the resistors 32 rapidly exceeds 125° C. with approximately 2 ms. In turn, the resistance of each resistor 32 rapidly rises to more than 36,000 Ω (i.e., greater than 4.56 in the graph) as the temperature rises to greater than 160° C. The ratio of the peak resistance to the initial resistance is greater than 4,000. Under steady state short circuit conditions, the steady state resistance of the current limiter is 20 Ω.

Referring again to FIG. 1, contact arcing and contact erosion of the separable contacts 14 are substantially reduced because the short circuit fault current is substantially reduced by the current limiter 10. Furthermore, under steady state short circuit conditions, the voltage of the power source 6 is substantially across the current limiter 10 (e.g., in the exemplary embodiment, the 15 A peak current flowing through the steady state resistance of 20 Ω results in a 300 V peak voltage which is about 96% of the 311 V peak voltage of the exemplary 220 VAC (rms) power source 6). In this manner, whenever the coil 16 is deenergized and, hence, the separable contacts 14 of the contactor 12 are opened, the switched voltage at the power inputs LOAD A,LOAD B,LOAD C of the load 8 is also substantially reduced.

Figure 5:
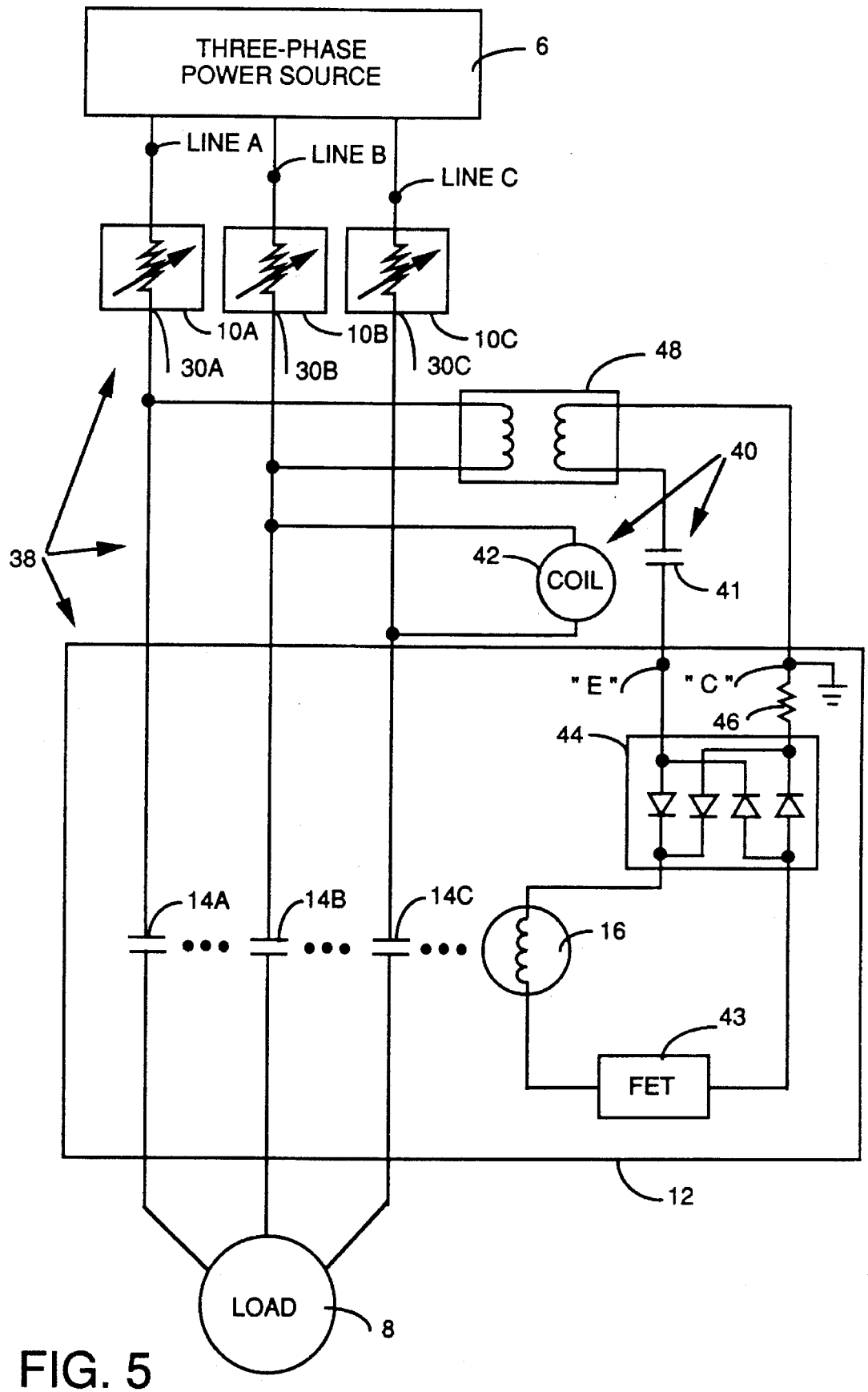
FIG. 5 is a block diagram of a circuit controller in accordance with another alternative embodiment of the invention.

In many applications, it is preferred to open the separable contacts 14 under any short circuit fault condition. In this manner, such fault in the power circuit 4 may be identified and corrected. Referring now to FIG. 5, a block diagram illustrates another alternative embodiment of the circuit controller which opens the separable contacts 14 under a short circuit fault condition. In this alternative embodiment, a circuit controller 38 includes an electromagnetic switching device, such as the exemplary contactor 12, the current limiters 10A,10B,10C, and a relay 40 having a normally-open contact 41 and a coil 42. Two external voltages "E" and "C" power the contactor 12 which connects the voltage "C" to an internal ground reference.

The coil 16 of the contactor 12 is selectively powered by a field effect transistor (FET) drive circuit 43. Alternating current from the voltages "E" and "C" is rectified by a full-wave bridge 44 and is limited by a resistor 46. Direct current from the bridge 44 selectively energizes the coil 16 of the contactor 12 whenever the FET drive circuit 43 is enabled. In the exemplary embodiment, an external transformer 48 is used to generate the voltages "E" and "C". The primary of the transformer 48 is connected to two of the outputs (e.g., terminal 30A and terminal 30B in the exemplary embodiment) of the three current limiters 10A,10B, 10C. The secondary of the transformer 48 generates an exemplary 120 VAC line voltage between the voltages "E" and "C".

The coil 42 of the exemplary relay 40 monitors the voltage across two of the outputs (e.g., terminal 30B and terminal 30C in the exemplary embodiment) of the three current limiters 10A,10B, 10C. Whenever the voltage across the terminals 30B and 30C drops below a threshold voltage (e.g., whenever current limiter 10B or current limiter 10C transitions to a state of higher resistance as a result of a short circuit fault current) the contact 41 of the relay 40 opens and the voltage "E", which provides power to the contactor 12, is disabled. Similarly, whenever the voltage across the terminals 30A and 30B drops below a threshold voltage (e.g., whenever current limiter 10A or current limiter 10B transitions to a state of higher resistance as a result of a short circuit fault current), the power to the contactor 12 is also disabled.

After any one of the current limiters 10A, 10B, 10C transitions to a state of higher resistance as a result of a short circuit fault current, the voltage of the power source 6 is substantially across such current limiter 10 and the voltage at the corresponding output 30 is substantially reduced. In this manner, in the exemplary embodiment, either the transformer 48 or the relay 40 detects such short circuit fault condition. Subsequently, the coil 16 of the contactor 12 is deenergized, thereby opening the separable contacts 14A, 14B,14C and disconnecting the power source 6 from the load 8.

Those skilled in the art will appreciate that other equivalent methods of deenergizing the coil 16 of the contactor 12 are possible. For example, three individual relays (not shown) having coils and normally-open contacts may be provided for each of the outputs 30A,30B,30C of the current limiters 10A,10B,10C, respectively. Each of the relay coils is connected between one of the outputs 30A, 30B,30C and a power source common (not shown). The normally-open contacts of such relays are connected in series between the secondary of the transformer 48 and the voltage "E". In this manner, the coil 16 of the contactor 12 is deenergized whenever any of the current limiters 10A,10B,10C transitions to a state of higher resistance as a result of a short circuit fault current and the voltage at the corresponding output 30A,30B,30C drops below a threshold voltage.

Accordingly, the exemplary circuit controllers 2,18,38 of FIGS. 1, 2 and 5, respectively, provide an improvement in cost, reliability and operational lifetime (i.e., 10 to 100 short circuit current limiting operations) in comparison to conventional circuit breakers (i.e., 3 operations) or fuses (i.e., 1 operation). Moreover, the exemplary current limiter 10 provides a reduction in enclosure space (i.e., the size is independent of the available short circuit fault current), improved current limiting, an elimination of contact welding of the separable contacts 14, better load protection, and an elimination of plasma and excessive visual display caused by contact arcing under short circuit conditions.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed:

1. A circuit controller apparatus for selectively connecting a power source to a load, said apparatus comprising:

non-overcurrent protective electrical switching means for selectively connecting said power source to said load and switching a current which flows from said power source and through said non-overcurrent protective electrical switching means; and conductive polymer current limiting means connected in series with said load for limiting the current which flows through said non-overcurrent protective electrical switching means whenever said power source is selectively connected to said load and for substantially limiting a short circuit current which flows from said power source, said conductive polymer current limiting means being connected in series with said nonovercurrent protective electrical switching means between said power source and said load, and exhibiting a first lower electrical resistance when conducting a first rated current, the first lower electrical resistance rapidly increasing to a second substantially higher electrical resistance when conducting a second current which is higher than the first rated current, in order that said conductive polymer current limiting means substantially limits all of the short circuit current which flows from said power source, said conductive polymer current limiting means including plurality of conductive polymer positive temperature coefficient (PTC) resistors which are each electrically connected in parallel with each other of the conductive polymer PTC resistors, said conductive polymer current limiting means including at least two conductive plates, and wherein each of the plurality of conductive polymer PTC resistors includes two terminals, each of the two conductive plates being electrically connected to a corresponding one of the two terminals of each of the plurality of conductive polymer PTC resistors.

2. A circuit controller apparatus for selectively connecting a power source having a voltage to a load, said apparatus comprising:

electrical switching means having separable contacts and a coil, the separable contacts being connected in series between said power source and said load, the coil being energized to close the separable contacts in order to connect said power source to said load and being deenergized to open the separable contacts in order to disconnect said power source from said load;

conductive polymer current limiting means connected in series between said power source and said electrical switching means for limiting the current which flows through the separable contacts whenever said power source is selectively connected to said load and for substantially limiting a short circuit current which flows from said power source, said conductive polymer current limiting means having an output which has a voltage substantially less than the voltage of said power source and through said conductive polymer current limiting means in order that the voltage of said power source is substantially across said conductive polymer current limiting means; and voltage sensing means connected to the output of said conductive polymer current limiting means for deenergizing the coil of said electrical switching means, in order to open the separable contacts of said electrical switching means and disconnect said power source from said load whenever the voltage of the output drops below a predetermined threshold, said conductive polymer current limiting means having a first electrical resistance when conducting a first rated current, the first lower electrical resistance rapidly increasing to a second substantially higher electrical resistance when conducting a second current which is higher than the first rated current, in order that said conductive polymer current limiting means substantially limits all of the short circuit current which flows from said power source, said conductive polymer current limiting means including a plurality of conductive polymer positive temperature coefficient (PTC) resistors which are each electrically connected in parallel with each of the plurality of conductive polymer PTC resistors, said conductive polymer current limiting means including at least two conductive plates, and wherein each of the plurality of conductive polymer PTC resistors includes two terminals, each of the two conductive plates being electrically connected to a corresponding one of the two terminals of each of the plurality of conductive polymer PTC resistors.

* * * * *